United States Patent
Noguchi et al.

(10) Patent No.: US 11,754,713 B2
(45) Date of Patent: Sep. 12, 2023

(54) RANGE FINDING APPARATUS AND CONTROL METHOD

(71) Applicant: NEC Corporation, Tokyo (JP)

(72) Inventors: Hidemi Noguchi, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 448 days.

(21) Appl. No.: 16/762,492

(22) PCT Filed: Dec. 5, 2018

(86) PCT No.: PCT/JP2018/044683
§ 371 (c)(1),
(2) Date: May 7, 2020

(87) PCT Pub. No.: WO2019/116980
PCT Pub. Date: Jun. 20, 2019

(65) Prior Publication Data
US 2021/0041561 A1    Feb. 11, 2021

(30) Foreign Application Priority Data
Dec. 15, 2017    (JP) .................................. 2017-240773

(51) Int. Cl.
*G01S 17/36*    (2006.01)
*G01S 7/487*    (2006.01)
(Continued)

(52) U.S. Cl.
CPC .............. *G01S 17/36* (2013.01); *G01S 7/487* (2013.01); *G01S 17/10* (2013.01); *G01S 17/32* (2013.01); *G01S 17/87* (2013.01)

(58) Field of Classification Search
None
See application file for complete search history.

(56) References Cited

U.S. PATENT DOCUMENTS 3,752,992 A * 8/1973 Fluhr .................. H04B 10/1121
                                                        398/152
3,962,705 A * 6/1976 Jamison .............. G01S 13/4445
                                                            342/65
(Continued)

FOREIGN PATENT DOCUMENTS

JP    S49-120673 A    11/1974
JP    H04-131787 A    5/1992
(Continued)

OTHER PUBLICATIONS

Japanese Office Action for JP Application No. 2019-559575 dated Jul. 13, 2021 with English Translation.
(Continued)

*Primary Examiner* — Reza Aghevli

(57) ABSTRACT

A range finding apparatus (2000) generates a plurality of range finding signals. The range finding apparatus (2000) generates transmission light acquired by performing at least one of quadrature modulation and polarization modulation on an optical carrier wave by using each of the generated range finding signals. The range finding apparatus (2000) transmits the generated transmission light. The range finding apparatus (2000) receives reflection light which is the transmission light reflected by an object to be measured. The range finding apparatus (2000) extracts a reception signal corresponding to each of the range finding signals by demodulating the reflection light. The range finding apparatus (2000) computes a distance to the object to be measured by using any one or more of the extracted reception signals.

7 Claims, 13 Drawing Sheets

(51) Int. Cl.
*G01S 17/10* (2020.01)
*G01S 17/87* (2020.01)
*G01S 17/32* (2020.01)

(56) References Cited

U.S. PATENT DOCUMENTS

| | | | | |
|---|---|---|---|---|
| 5,093,666 | A * | 3/1992 | Jamison | G01S 13/4409 |
| | | | | 342/65 |
| 5,164,733 | A | 11/1992 | Nettleton et al. | |
| 9,905,992 | B1 * | 2/2018 | Welford | G01S 7/4814 |
| 10,222,474 | B1 * | 3/2019 | Raring | H01S 5/4012 |
| 2006/0182383 | A1 * | 8/2006 | Slotwinski | G01S 17/34 |
| | | | | 385/11 |
| 2012/0082007 | A1 * | 4/2012 | Duxbury | G07C 1/24 |
| | | | | 368/10 |
| 2013/0135140 | A1 * | 5/2013 | Kishigami | G01S 7/282 |
| | | | | 342/202 |
| 2013/0135606 | A1 * | 5/2013 | Giacotto | G01C 3/08 |
| | | | | 356/5.01 |
| 2013/0235366 | A1 * | 9/2013 | Giacotto | G01S 17/10 |
| | | | | 356/5.01 |
| 2013/0258312 | A1 * | 10/2013 | Lewis | G01S 7/4865 |
| | | | | 356/4.01 |
| 2015/0180581 | A1 * | 6/2015 | Steiner | G01S 17/87 |
| | | | | 398/188 |
| 2017/0031005 | A1 * | 2/2017 | Jaeger | G01S 7/4021 |
| 2018/0059221 | A1 * | 3/2018 | Slobodyanyuk | G01S 7/4814 |
| 2018/0059248 | A1 * | 3/2018 | O'Keeffe | G01S 17/42 |
| 2018/0088214 | A1 * | 3/2018 | O'Keeffe | G01S 7/4815 |
| 2018/0095175 | A1 * | 4/2018 | O'Keeffe | G01S 17/42 |
| 2018/0172807 | A1 * | 6/2018 | Korkut | G01S 7/4865 |
| 2018/0188358 | A1 * | 7/2018 | Li | G01S 7/484 |
| 2018/0259645 | A1 * | 9/2018 | Shu | G01S 7/4865 |
| 2018/0275274 | A1 * | 9/2018 | Bao | G01S 7/486 |
| 2019/0033451 | A1 | 1/2019 | Koyama et al. | |
| 2019/0056497 | A1 * | 2/2019 | Pacala | G01S 7/4863 |
| 2019/0107811 | A1 * | 4/2019 | Broussard | G01S 7/4915 |
| 2019/0154832 | A1 * | 5/2019 | Maleki | G01S 7/4911 |
| 2019/0162823 | A1 * | 5/2019 | Eckstein | G01S 7/4814 |
| 2019/0170857 | A1 * | 6/2019 | Nakajima | G01S 13/931 |
| 2019/0178993 | A1 * | 6/2019 | Sadhu | G01S 17/34 |
| 2021/0041561 | A1 * | 2/2021 | Noguchi | G01S 7/487 |

FOREIGN PATENT DOCUMENTS

| | | | | |
|---|---|---|---|---|
| JP | H05-333151 A | | 12/1993 | |
| JP | 2007-155660 A | | 6/2007 | |
| JP | 2008-128657 A | | 6/2008 | |
| JP | 2008-531993 A | | 8/2008 | |
| JP | 2012-052964 A | | 3/2012 | |
| JP | 2012052946 A | * | 3/2012 | G01B 11/022 |
| JP | 2015-075461 A | | 4/2015 | |
| JP | 2015-169508 A | | 9/2015 | |
| JP | 2015169508 A | * | 9/2015 | G01B 11/022 |
| WO | 2016/210401 A1 | | 12/2016 | |
| WO | WO 2017/134707 A1 | | 8/2017 | |

OTHER PUBLICATIONS

Supplementary Partial European Search Report for EP Application No. 18888344.1 dated Jan. 18, 2021.
International Search Report dated Mar. 5, 2019, in corresponding PCT International Application.
Extended European Search Report for EP Application No. EP18888344.1 dated Jun. 1, 2021.
Japanese Office Action for JP Application No. 2021-180050, dated Nov. 15, 2022 with English Translation.

\* cited by examiner

RANGE FINDING APPARATUS AND CONTROL METHOD

CROSS-REFERENCE TO RELATED PATENT APPLICATIONS

This application is a National Stage Entry of International Application Na PCT/JP2018/044683, filed Dec. 5, 2018, which claims priority from Japanese Patent Application No. JP 2017-240773, filed Dec. 15, 2017, The entire contents of the above-referenced applications are expressly incorporated herein by reference.

TECHNICAL FIELD

The present invention relates to a range finding apparatus.

BACKGROUND ART

A range finding apparatus that performs distance measurement using light waves has been developed. A range finding apparatus using the light waves transmits predetermined transmission light from the range finding apparatus, receives reflection light acquired in such a way that the transmission light is reflected in an object to be measured, and performs a distance measurement by analyzing the reflection light. For example, a range finding method includes a Time-of-Flight (ToF) method for computing a distance based on TOF time of the reflection light (time from transmission of the transmission light to reception of reflection light), a frequency difference detection method (for example, a Frequency Modulated Continuous Wave (FMCW) method) for computing the distance based on a frequency difference between the transmitted light and the reflection light, a phase difference detection method, or the like.

A related document that discloses the range finding apparatus using the light waves includes, for example. Patent Document 1. Patent Document 1 discloses an apparatus that performs distance measurement using the phase difference detection method. The device sequentially selects a plurality of frequencies and sequentially transmits range finding light modulated at each frequency. Further, a final measurement result is acquired based on a distance acquired using each range finding light.

RELATED DOCUMENT

Patent Document

[Patent Document 1] Japanese Patent Application Publication No. 2007-155660

SUMMARY OF THE INVENTION

Technical Problem

The inventor has found a new technology for performing distance measurement using light waves. One of the objects of the present invention is to provide a new technology for performing the distance measurement using the light waves.

Solution to Problem

A range finding apparatus of the present invention includes 1) a generation unit that generates a plurality of range finding signals, 2) a modulation unit that generates transmission light acquired by performing at least one of quadrature modulation and polarization modulation on an optical carrier wave by using each of the generated range finding signals, 3) a transmission unit that transmits the generated transmission light, 4) a reception unit that receives reflection light which is light acquired in such a way that the transmission light is reflected in an object to be measured, 5) an extraction unit that extracts reception signals corresponding to the respective range finding signals by demodulating the reflection light, and 6) a computation unit that computes distances to the object to be measured using any one or more of the extracted reception signals.

A control method of the present invention is a control method executed by a computer. The control method includes 1) a generation step of generating a plurality of range finding signals, 2) a modulation step of generating transmission light acquired by performing at least one of quadrature modulation and polarization modulation on an optical carrier wave by using each of the generated range finding signals, 3) a transmission step of transmitting the generated transmission light, 4) a reception step of receiving reflection light which is light acquired in such a way that the transmission light is reflected in an object to be measured, 5) an extraction step of extracting reception signals corresponding to the respective range finding signals by demodulating the reflection light, and 6) a computation step of computing distances to the object to be measured using any one or more of the extracted reception signals.

Advantageous Effects of Invention

According to the present invention, a new technology for performing distance measurement using light waves is provided.

BRIEF DESCRIPTION OF THE DRAWINGS

The above-described object and other objects, features, and advantages will be further clarified by the preferred embodiments described below and the accompanying drawings attached thereto.

DESCRIPTION OF EMBODIMENTS

Figure 1:
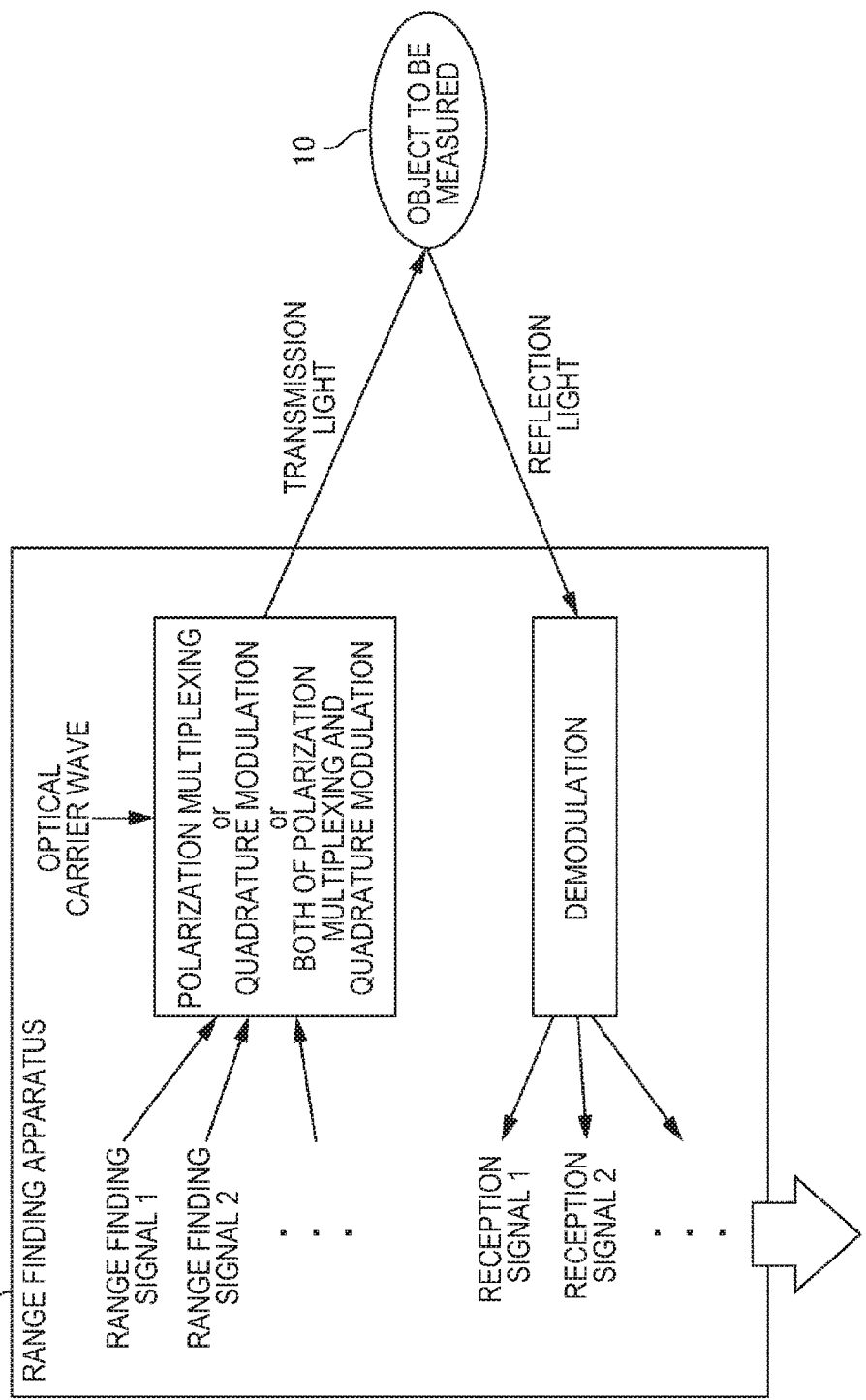
FIG. 1 is a diagram conceptually illustrating an operation of a range finding apparatus according to a first example embodiment.

Hereinafter, embodiments of the present invention will be described with reference to the accompanying drawings. Also, the same reference numerals are attached to the same components throughout the drawings, and description thereof will not be repeated. In addition, unless otherwise specified, each block represents a configuration in a functional unit instead of a configuration in a hardware unit in each block diagram.

Example Embodiment 1

<Overview>

FIG. 1 is a diagram for conceptually illustrating an operation of a range finding apparatus 2000 according to a first example embodiment. Note that, FIG. 1 is a diagram illustrating an example for a purpose of easily understanding the operation of the range finding apparatus 2000, and the operation of the range finding apparatus 2000 is not limited by FIG. 1.

The range finding apparatus 2000 is a device that measures (measures distances) a distance from the range finding apparatus 2000 to an object 10 to be measured by using light waves. In general, in distance measurement using the light waves, a distance is computed by transmitting a transmission light in which a light wave serving as a carrier wave (hereinafter referred to as an optical carrier wave) is modulated by a range finding signal, receiving a reflection light which is reflected by an object that is a distance measurement target to be measured, and analyzing the reflection light.

As a range finding method using the light waves includes various methods, such as a time-of-flight measurement method (ToF method), a frequency difference detection method (for example, FMCW method), and a phase difference detection method. In each of the range finding methods, the range finding signal are different from each other. In addition, even in a case of the same range finding method, the range finding signal differs depending on setting. For example, in the frequency difference detection method, the range finding signal differs depending on a frequency modulation velocity to be adopted.

The range finding apparatus 2000 performs distance measurement using a plurality of range finding signals at once. Therefore, the range finding apparatus 2000 generates the transmission light by performing quadrature (In-Phase Quadrature-Phase (IQ)) modulation, polarization multiplexing, or both on the optical carrier wave to transmit the transmission light using the plurality of range finding signals. For example, it is assumed that the range finding apparatus 2000 uses a range finding signal 1 and a range finding signal 2. In this case, for example, the range finding apparatus 2000 modulates an I component (In-Phase component) of an X polarized wave of the optical carrier wave by using the range finding signal 1, and modulates a Q component (Quadrature-Phase component) of the X polarized wave of the optical carrier wave by using the range finding signal 2. In this manner, the transmission light including two range finding signals is generated.

The range finding apparatus 2000 receives the reflection light acquired in such a way that the transmission light generated as described above is reflected by the object 10 to be measured. The range finding apparatus 2000 extracts reception signals corresponding to respective range finding signal by demodulating the received reflection light. For example, as described above, in a case where the range finding signal 1 and the range finding signal 2 are included in the transmission light, the range finding apparatus 2000 acquires two reception signals by performing polarization separation and quadrature demodulation on the reflection light. Then, each of the two reception signals corresponds to any of the range finding signal 1 and the range finding signal 2.

The range finding apparatus 2000 computes a distance from the range finding apparatus 2000 to the object 10 to be measured using any one or more of the extracted reception signals. For example, it is assumed that the range finding signal 1 is a range finding signal generated according to the frequency difference detection method, and the range finding signal 2 is a range finding signal generated according to the phase difference detection method. Further, it is assumed that a reception signal 1 corresponds to the range finding signal 1 and a reception signal 2 corresponds to the range finding signal 2. In this case, it is possible for the range finding apparatus 2000 to compute the measurement distance based on a frequency difference between the range finding signal 1 and the reception signal 1. In addition, it is also possible for the range finding apparatus 2000 to compute the measurement distance based on a phase difference between the range finding signal 2 and the reception signal 2.

<Advantageous Effects>

According to the range finding apparatus 2000 of the example embodiment, it is possible to simultaneously transmit a plurality of range finding signals with one transmission light by performing the quadrature modulation or the polarization multiplexing using a plurality of range finding signals. Therefore, it is possible to compute the measurement distance with high accuracy by using the measurement distance computed based on the plurality of range finding signals. Although details will be described later, the measurement distance may be acquired with high accuracy using, for example, a method of performing statistical processing on computation results acquired from the plurality of range finding signals, a method of adopting only a computation result which is considered to be accurate among the plurality of computation results, or the like.

Note that, in a case where it is desired to perform the distance measurement using the plurality of range finding signals, a method of performing time-multiplexing on the range finding signals as in a device disclosed in Patent Document 1 may be taken into a consideration. However, in the method, time required for the distance measurement is longer than time for performing the distance measurement using one range finding signal.

In contrast, in the range finding apparatus 2000 of the example embodiment, the distance measurement using the plurality of range finding signals is realized for the same time for performing the distance measurement using one range finding signal. Therefore, compared to the method of performing the time-multiplexing on the plurality of range finding signals, the distance measurement may be performed in a shorter time. That is, the measurement efficiency increases.

In addition, the method of performing the time-multiplexing on the plurality of range finding signals, a positional relationship between the range finding apparatus 2000 and the object to be measured are different among the distance measurement using each range finding signal in a case where the positional relationship between the range finding apparatus 2000 and the object to be measured changes (for example, in a case where at least one of the object to be measured and the range finding apparatus 2000 is moving). Accordingly, in a case where the positional relationship between the range finding apparatus 2000 and the object to be measured changes over time, it is not possible to simultaneously perform the distance measurement on the positional relationship at a certain moment of the same time using the plurality of range finding signals.

In contrast, according to the range finding apparatus 2000 of the example embodiment, the plurality of range finding signals are embedded in one transmission light, and thus it is possible to transmit the plurality of range finding signals at the same timing. Therefore even in a case where the positional relationship between the range finding apparatus 2000 and the object to be measured changes as described above, it is possible to simultaneously realize the distance measurement using the plurality of range finding signals for the positional relationship between the range finding apparatus 2000 and the object to be measured at a certain moment of the same time, and thus the distance measurement may be performed with high accuracy.

Hereinafter, the example embodiment will be described in further detail.

<Example of Functional Configuration of Range Finding Apparatus 2000>

Figure 2:
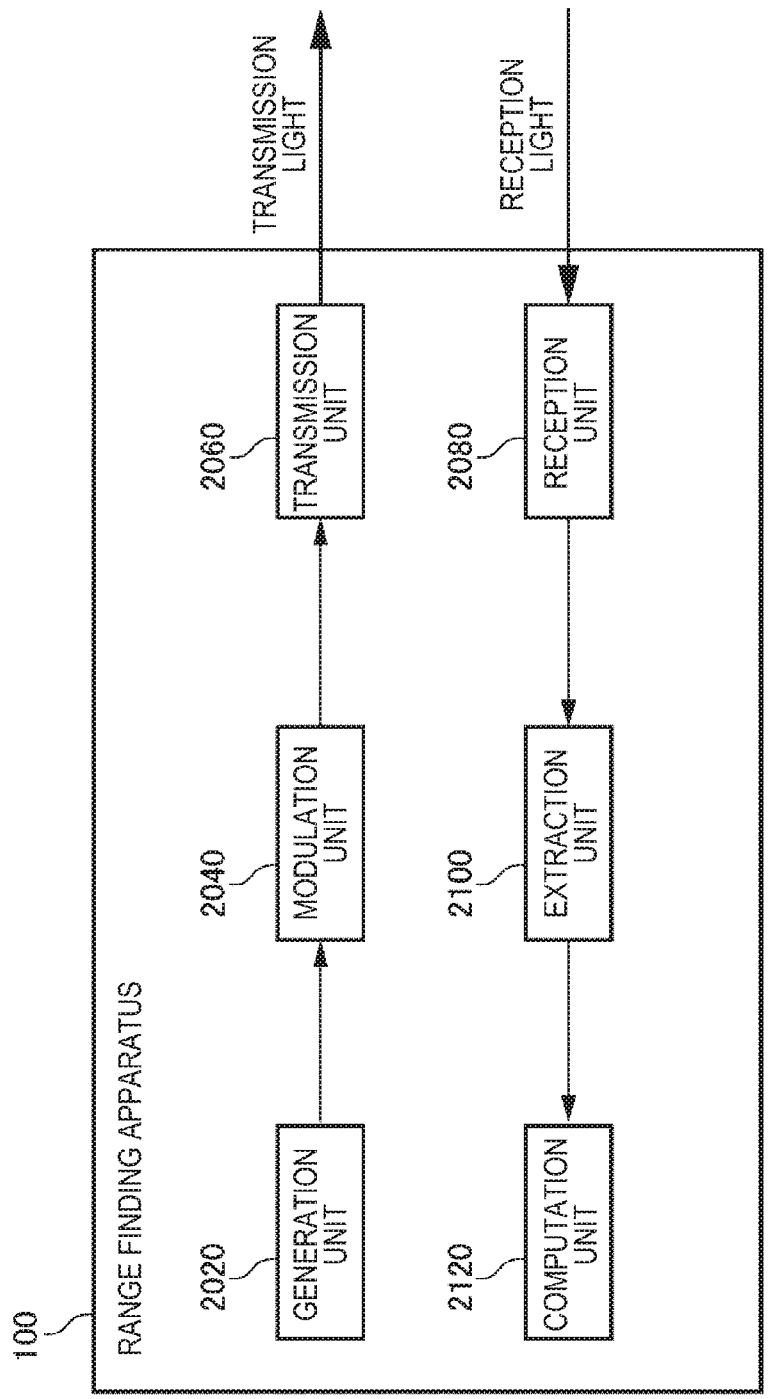
FIG. 2 is a diagram illustrating a functional configuration unit of the range finding apparatus.

FIG. 2 is a diagram illustrating functional configuration units of the range finding apparatus 2000. The range finding apparatus 2000 includes a generation unit 2020, a modulation unit 2040, a transmission unit 260, a reception unit 2080, an extraction unit 2100, and a computation unit 2120. The generation unit 2020 generates the plurality of range finding signals. The modulation unit 2040 generates the transmission light using each of the generated range finding signals. The transmission light is generated by performing at least one of the quadrature modulation and the polarization multiplexing on the optical carrier wave. The transmission unit 2060 transmits the generated transmission light. The reception unit 2080 receives the reflection light acquired in such a way that the transmitted light is reflected in the object 10 to be measured. The extraction unit 2100 extracts the reception signals each corresponding to the range finding signals by demodulating the reflection light. The computation unit 2120 computes a distance to the object 10 to be measured using any one or more of the extracted reception signals.

<Example of Hardware Configuration>

Figure 3:
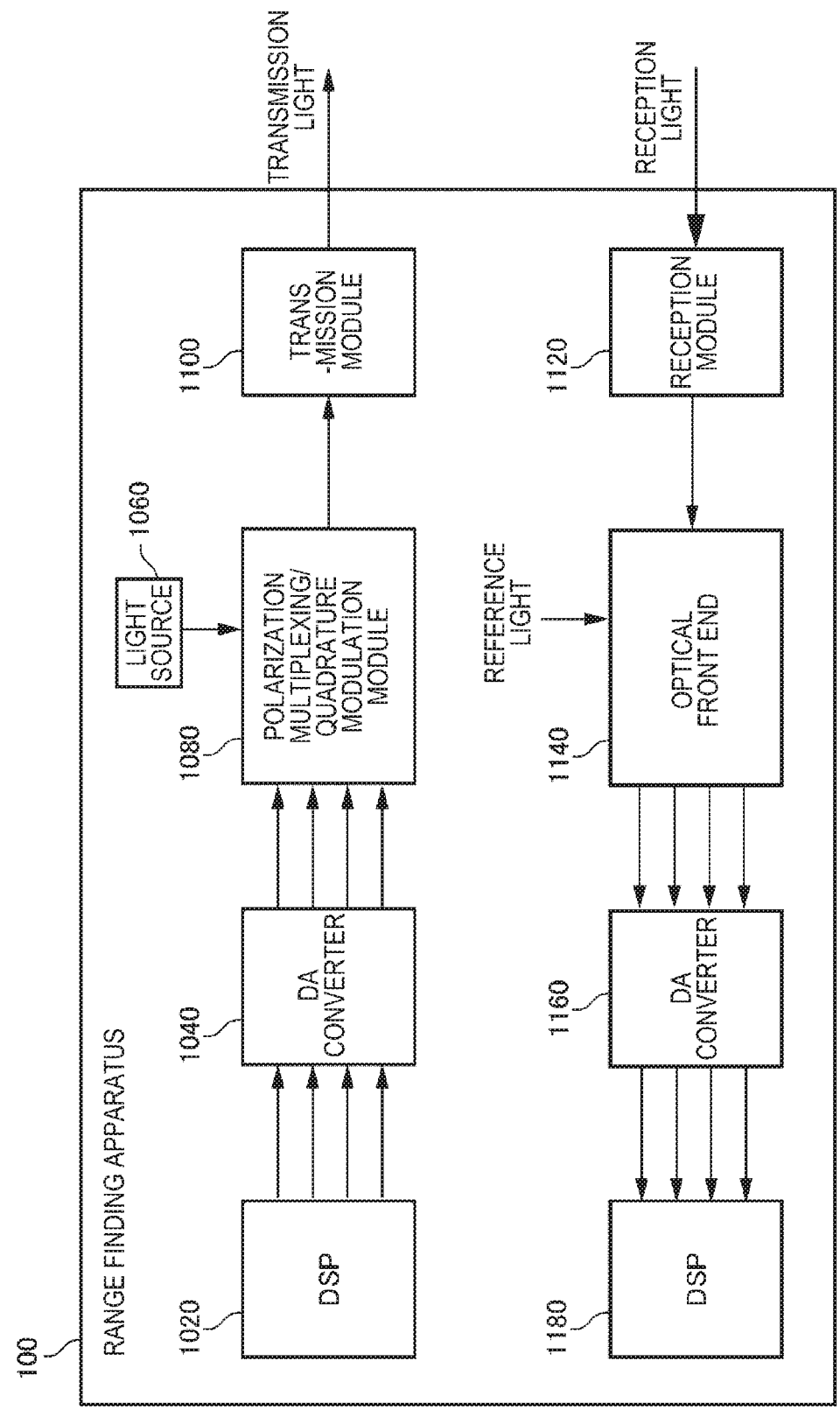
FIG. 3 is a diagram illustrating a hardware configuration of the range finding apparatus.

FIG. 3 is a diagram illustrating a hardware configuration of the range finding apparatus 2000. The range finding apparatus 2000 of FIG. 3 includes a digital signal processor 1020, a digital-to-analog converter 1040, a light source 1060, a polarization multiplexing/quadrature modulation module 1080, a transmission module 1100, a reception module 1120, an optical front end 1140, an analog-to-digital converter 1160, and a digital signal processor 1180. In the range finding apparatus 2000 of FIG. 3, the quadrature modulation and the polarization multiplexing are performed. Therefore, the range finding signals are embedded in the I and Q components of each of the X polarized wave and a Y polarized wave of the transmission light, that is, on four channels.

The digital signal processor (DSP) 1020 is a processor that realizes the generation unit 2020. In an example of FIG. 3, four range finding signals are output from the digital signal processor 1020. Each of the range finding signals output from the digital signal processor 1020 is converted into an analog electric signal by the digital-to-analog (DA) converter 1040.

The polarization multiplexing/quadrature modulation module 1080 is a module that realizes the modulation unit 2040. The polarization multiplexing/quadrature modulation module 1080 performs the polarization multiplexing and the quadrature modulation on the optical carrier wave which is output from the light source 1060. It is possible to realize the polarization multiplexing/quadrature modulation module 1080 using various light modulation elements. The light source 1060 is arbitrary light source that outputs the optical carrier wave. For example, in a case where laser light is used as the transmission light, the light source 1060 is realized by a laser oscillator or the like. The polarization multiplexing/ quadrature modulation module 1080 embeds the range finding signals in the respective four channels of the optical carrier wave by performing the polarization multiplexing and the quadrature modulation on the optical carrier wave which is output from the light source 1060 by using the analog signals output from the digital-to-analog converter 1040.

The transmission module 1100 is a module that realizes the transmission unit 2060. The optical transmission module 110 includes an optical system (a lens or the like) for outputting the transmission light to an outside of the range finding apparatus 2000, and an optical system (a mirror or the like) for controlling an output direction of the transmission light.

The reception module 1120 is a module that realizes the reception unit 2080. The reception module 1120 includes an optical system (the lens, the mirror, and the like) for taking the reflection light into an inside of the range finding apparatus 2000.

The optical front end 1140 and the analog-to-digital converter 1160 realize the reception unit 2080. The optical front end 1140 separates the reflection light into the X polarized wave and the Y polarized wave by a polarization splitter, and causes each reflection light to interfere with the reference light. In this manner, the reflection light is separated into four components (the I component of the X polarized wave, the Q component of the X polarized wave, the I component of the Y polarized wave, and the Q component of the Y polarized wave). Note that, as a specific method of separating a received optical signal into the components, it is possible to use a known method used in digital coherent communication. However, at this point, the plurality of range finding signals embedded at a transmission side are mixed with each other due to the frequency rotation of the polarization rotation, the optical carrier wave and the reference light, the phase rotation, and the like, and thus the extraction unit, described later in detail, accurately separates range finding signals.

Further, in the optical front end 1140, each of the separated optical signals is input to the photoelectric conversion elements. Therefore, the optical front end 1140 outputs analog electric signals corresponding to the respective separated optical signals.

The four electric signals output from the optical front end 1140 are input to the analog-to-digital converter 1160. The respective analog electric signals output from the optical front end 1140 are converted into digital signals by the analog-to-digital converter 1160. The digital signals are outputs from the reception unit 2080. The reception unit 2080 may further include a compensation circuit for compensating an aberration of the optical system with respect to a digital signal output from the analog-to-digital converter or incompleteness of analog electric circuit characteristics included in the transmission and reception, and the like (not shown in the drawings). For example, it is possible to use an existing technology to realize the compensation circuit.

The digital signal processor 1180 is a digital signal processor that realizes the extraction unit 2100 and the computation unit 2120. The digital signal processor 1180 acquires the reception signals corresponding to the four range finding signals (processing by the extraction unit 2100) by performing the polarization separation and the quadrature demodulation on the four digital signals output from the analog-to-digital converter 1160. In addition, the digital signal processor 1180 computes the distance to the object 10 to be measured by analyzing the reception signals (processing by the computation unit 2120).

Note that, the digital signal processor 1180 acquires information relevant to each of the range finding signals (information relevant to a range finding method and setting thereof) in order to analyze the reception signals. For example, the information is stored in a storage device accessible from both the digital signal processor 1020 and the digital signal processor 1180. In this manner, it is possible for the digital signal processor 1020 to generate the range finding signals according to the information read from the storage device, and it is possible for the digital signal processor 1180 can recognize settings relevant to the range finding signals by reading the information from the storage device.

Figure 4:
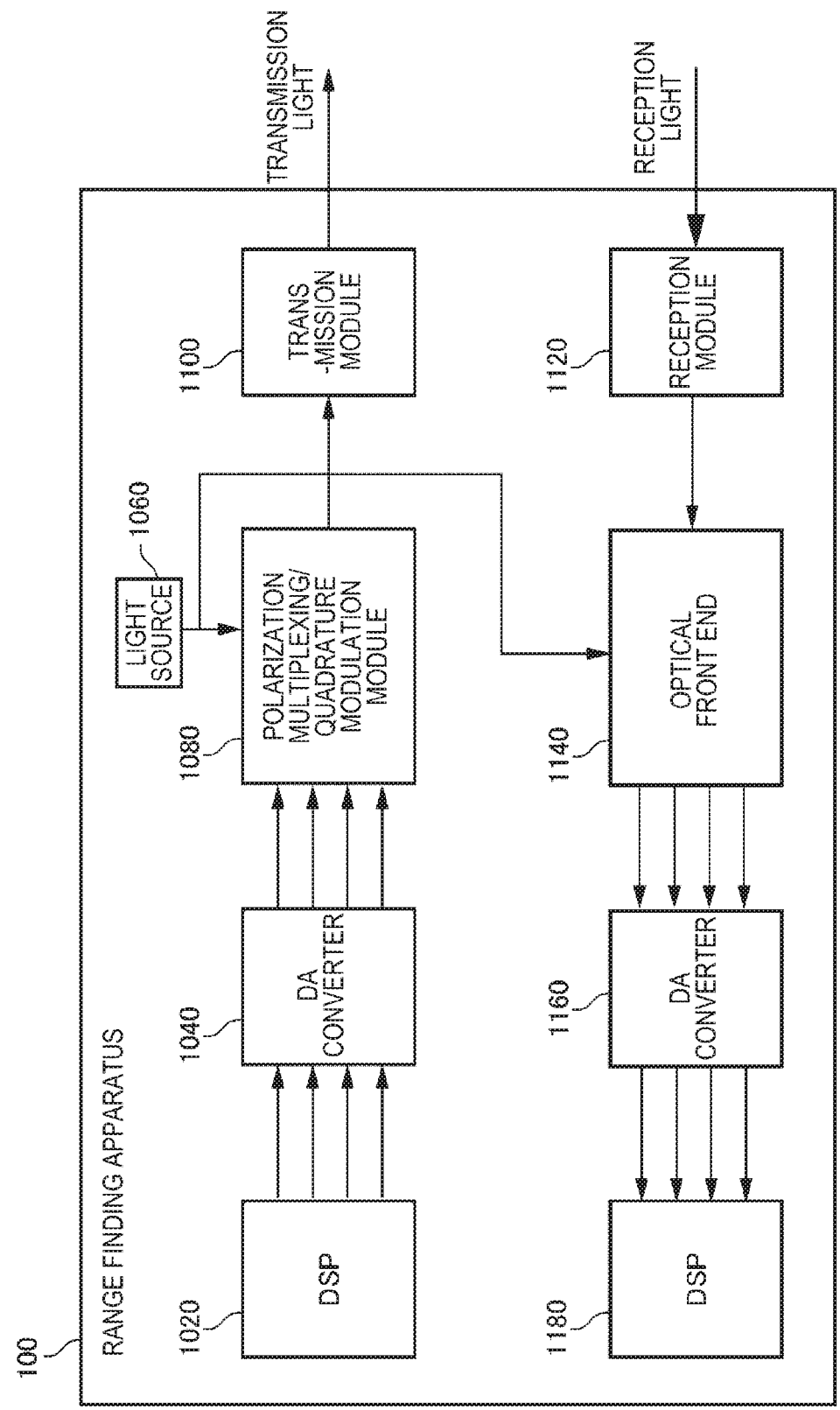
FIG. 4 is a diagram illustrating a variation in reference light.
Figure 5:
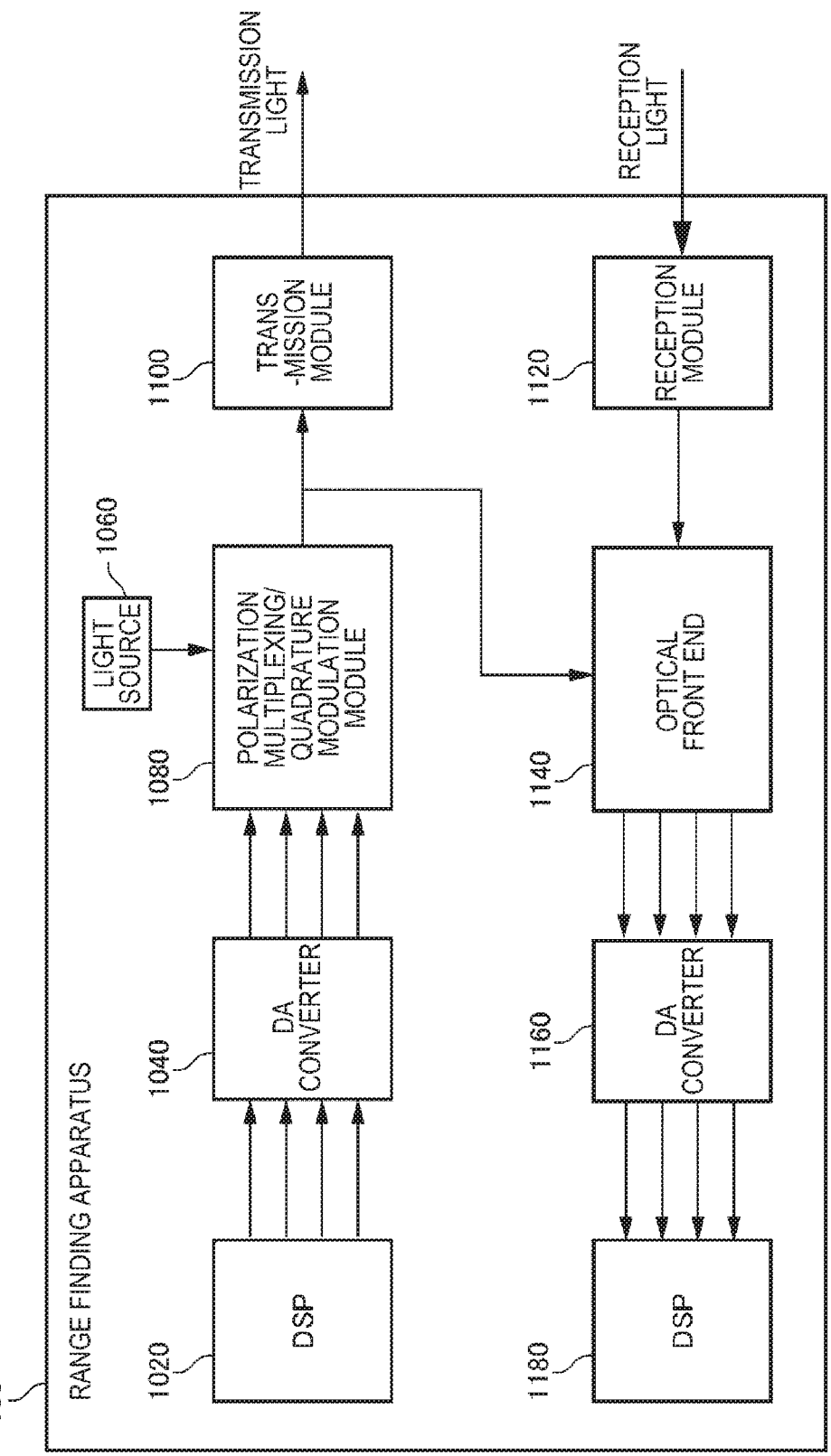
FIG. 5 is a diagram illustrating a variation in the reference light.
Figure 6:
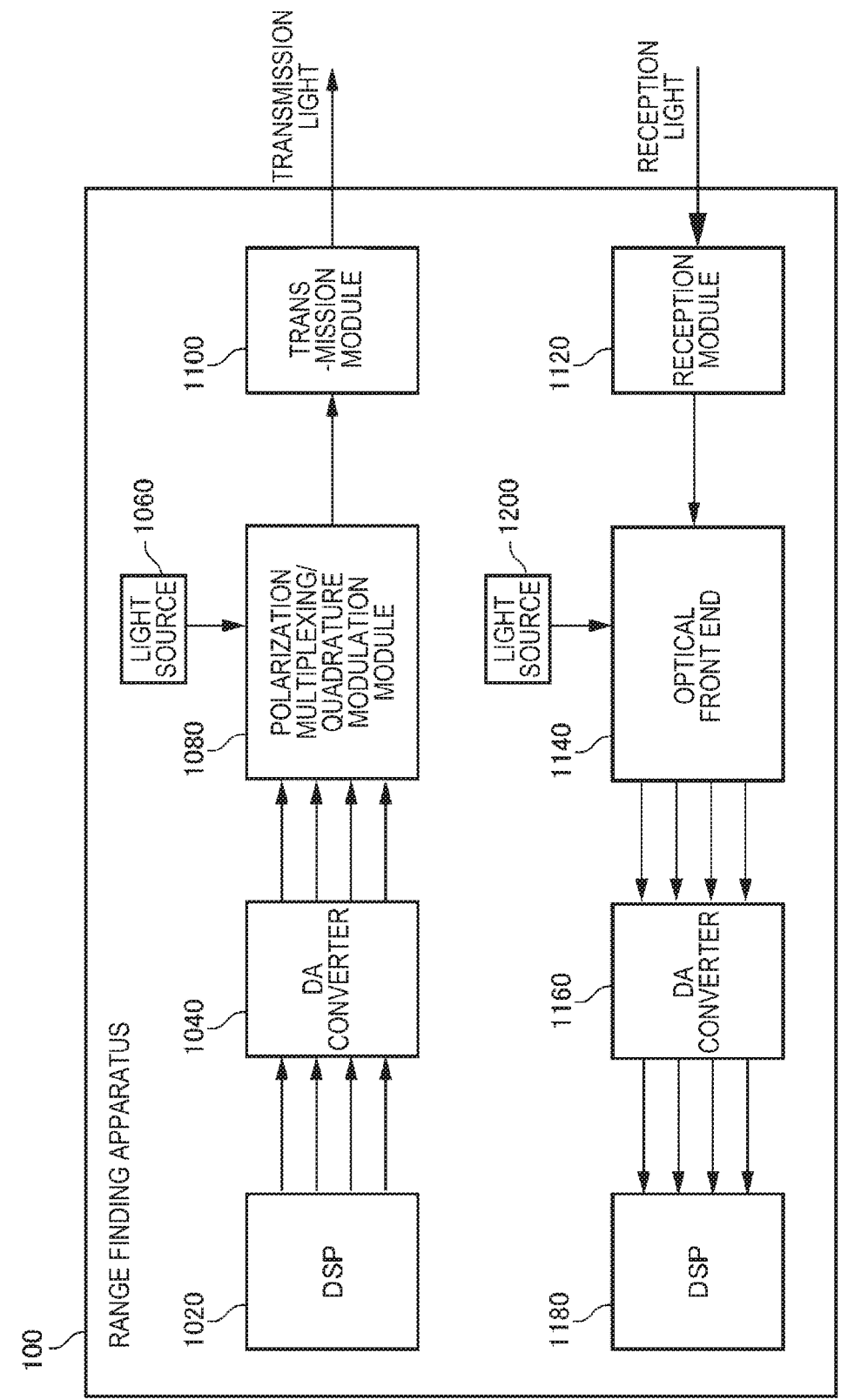
FIG. 6 is a diagram illustrating a variation in the reference light.

Here, as the reference light input to the optical front end 1140, it is possible to use 1) the optical carrier wave output from the light source 1060, 2) the transmission light output from the polarization multiplexing/quadrature modulation module 1080, 3) local light output from another light source separately provided, and the like. FIGS. 4, 5, and 6 are diagrams illustrating variations in the reference light. FIGS. 4, 5, and 6 illustrate the cases 1), 2), and 3), respectively. Note that, it may adopt a configuration (not shown in the drawings) in which a switch mechanism for causing the three reference lights to be input to the reception unit 2080 in a selectable manner, and one of those three reference light is appropriately used.

<Flow of Processing>

Figure 7:
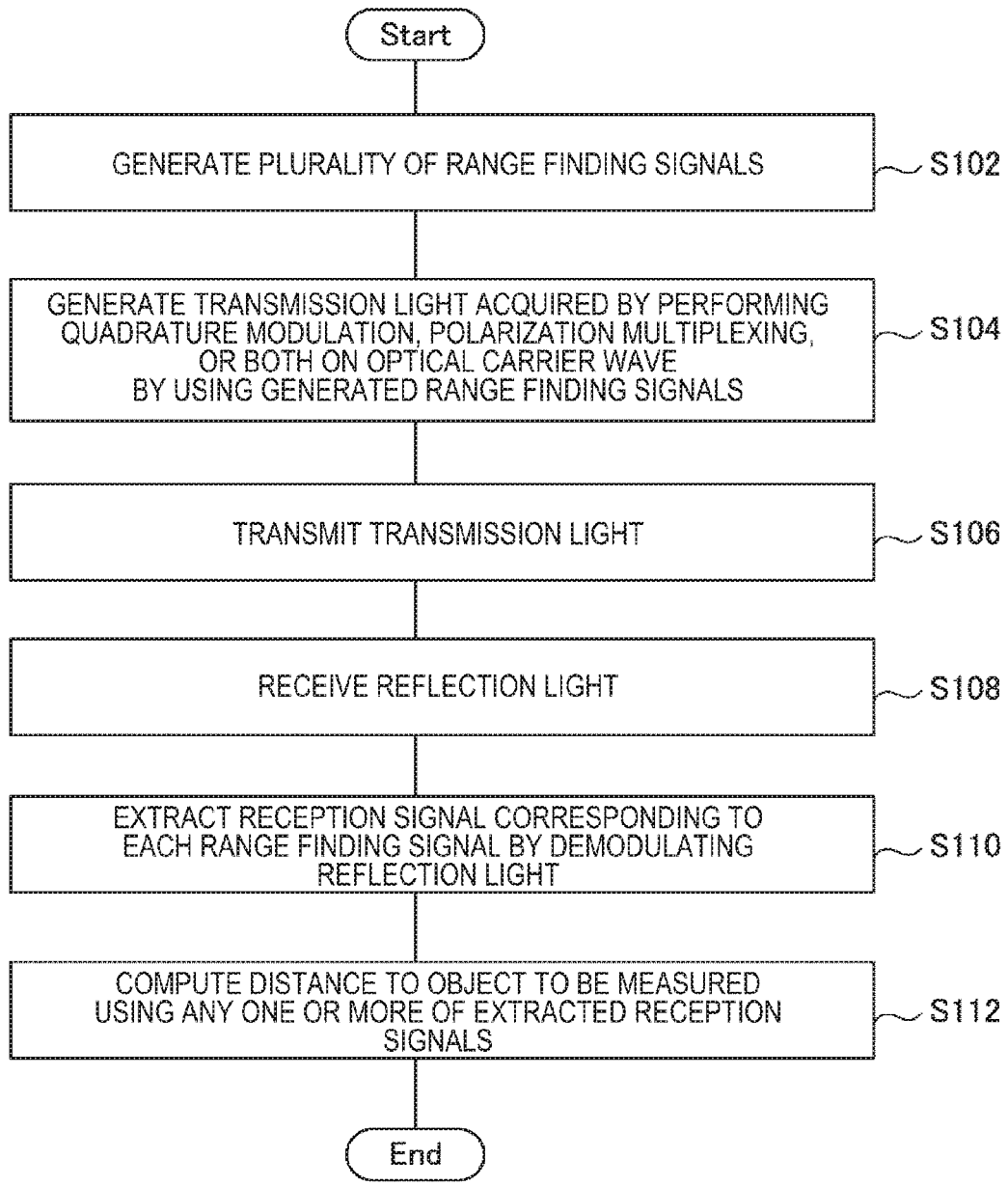
FIG. 7 is a flowchart illustrating a flow of processing executed by the range finding apparatus.

FIG. 7 is a flowchart illustrating a flow of processing executed by the range finding apparatus 2000. The generation unit 2020 generates the plurality of range finding signals (S102). The modulation unit 2040 generates the transmission light acquired by performing the quadrature modulation, the polarization multiplexing, or both on the optical carrier wave by using each of the generated range finding signals (S104). The transmission unit 2060 transmits the generated transmission light (S106). The reception unit 2080 receives the reflection light which is reflected by the object 10 to be measured (S108). The extraction unit 2100 extracts the reception signal corresponding to each range finding signal by demodulating the reflection light (S110). The computation unit 2120 computes the distance to the object 10 to be measured using any one or more of the extracted reception signals (S112).

<Range Finding Signal>

The generation unit 2020 generates the plurality of range finding signals (S102). For example, the generation unit 2020 generates the plurality of range finding signals according to range finding methods which are different from each other. For example, it is assumed that the range finding signals are embedded in four channels each having different transmission light. In this case, the generation unit 2020 generates the range finding signals according to four range finding methods which are different from each other.

Figure 8:
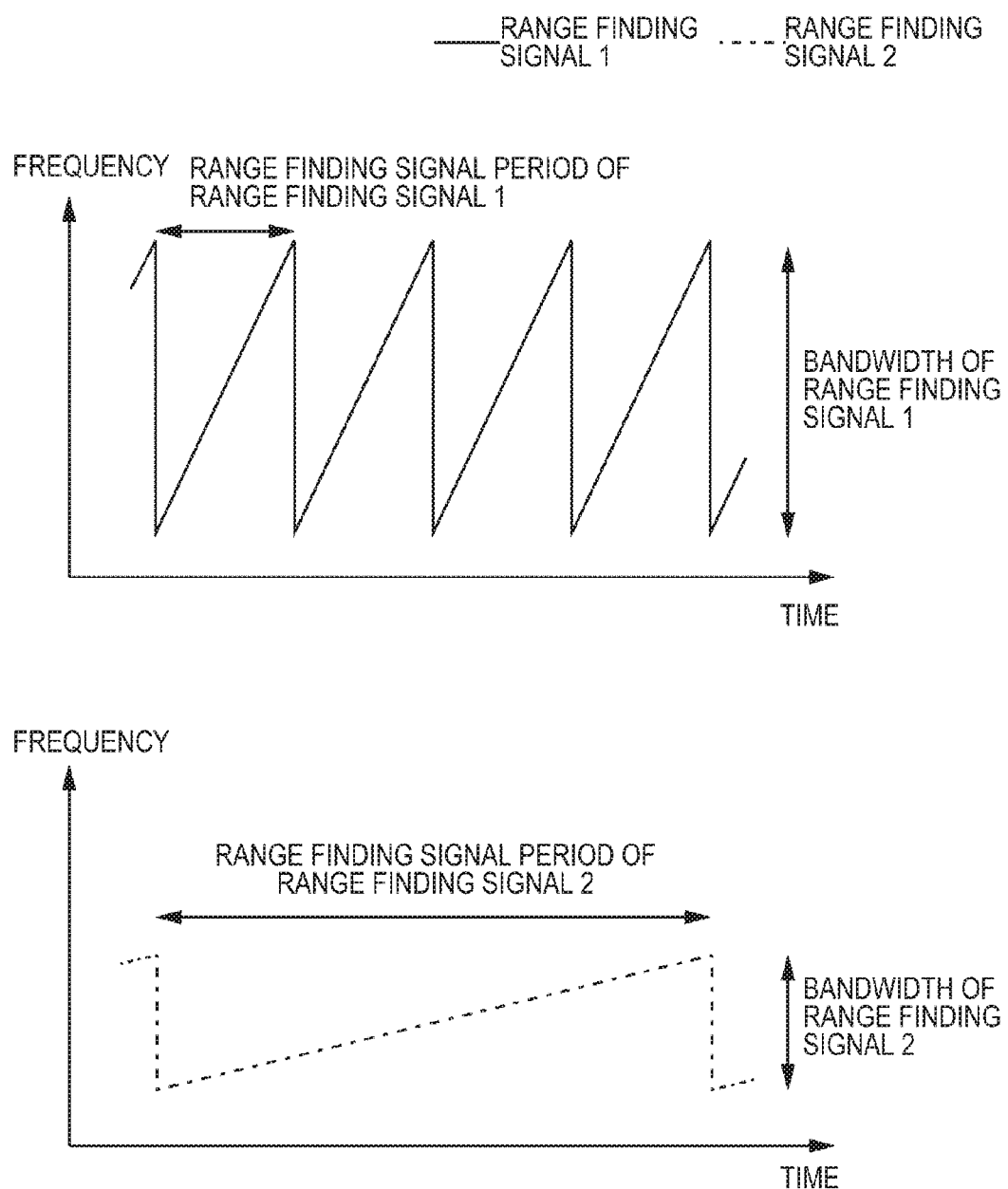
FIG. 8 is a diagram illustrating a plurality of range finding signals each having frequency modulation rates which are different from each other.

In another example, the generation unit 2020 generates the plurality of range finding signals, which are different from each other, according to the same range finding method. For example, it is assumed that a frequency difference detection method is used as the range finding method. In this case, the generation unit 2020 generates the plurality of range finding signals each having different frequency modulation rates. FIG. 8 is a diagram illustrating the plurality of range finding signals each having the different frequency modulation rates. In FIG. 8, the range finding signal 1 has a shorter period of the range finding signal (here, a period of change in frequency) while having a wider frequency bandwidth. On the other hand, the range finding signal 2 has a longer period of the range finding signal while having a narrower frequency bandwidth.

Here, it is known that a distance resolution is inversely proportional to a bandwidth in the distance measurement using the frequency difference detection method. In addition, it is also known that a measurable distance is proportional to a period of the range finding signal. Therefore, in distance measurement performed using the range finding signal 1, the measurable distance is shorter while the distance resolution is finer. Conversely, in the distance measurement performed using the range finding signal 2, the measurable distance is longer while the distance resolution is coarser.

Here, in a case where the two range finding signals are used together as shown in FIG. 8, it is possible to use both the range finding signal having the finer distance resolution and the range finding signal having the longer measurable distance, and thus it is possible to perform the distance measurement with the longer distance and the finer distance resolution.

Note that, in a case where the frequency difference detection method is used, the optical frequency of the optical carrier wave or an optical intensity may be modulated by the modulation unit 2040 using the range finding signals. In addition, although the range finding signal in FIG. 8 is a sawtooth wave, the range finding signal in the frequency difference detection method is not limited thereto, and it is possible to use arbitrary signal representing a periodic frequency change.

Figure 9:
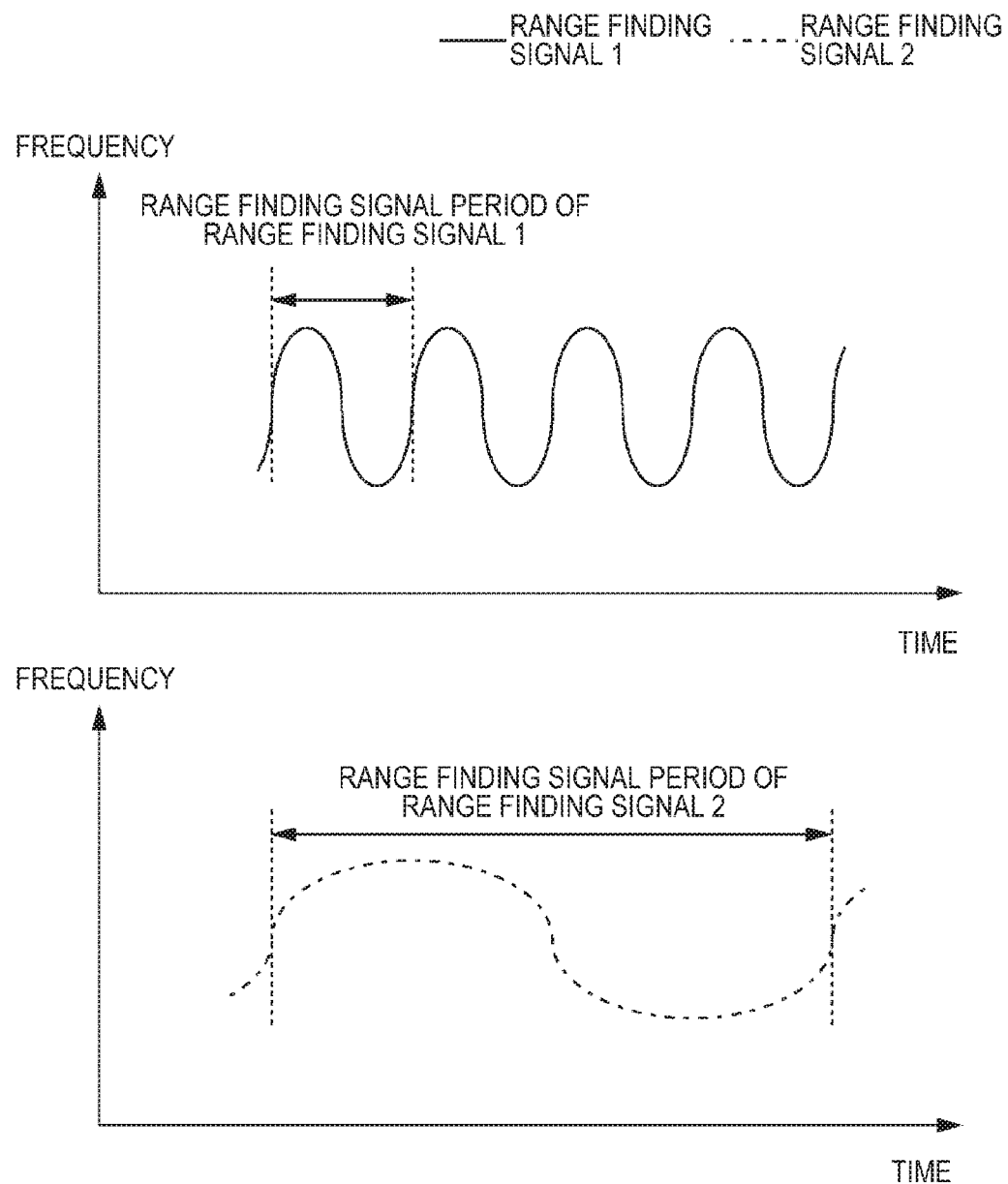
FIG. 9 is a diagram illustrating a plurality of range finding signals each having different phase modulation rates.

In another example, it is assumed that a phase difference detection method is used as the range finding method. In this case, the generation unit 2020 generates a plurality of range finding signals each having different phase modulation rates. FIG. 9 is a diagram illustrating the plurality of range finding signals each having the phase modulation rates which are different from each other. In FIG. 9, the range finding signal 1 has a shorter period of the range finding signal (here, a period of change in intensity), compared to the range finding signal 2.

Here, in the distance measurement using the phase difference detection method, the number of repetitions of the range finding signals per unit range finding time increases in a case where the range finding signal period becomes shorter. Therefore, in a case where averaging processing is performed, the range finding accuracy improves to that extent. In addition, it is also known that a measurable distance is proportional to a period of the range finding signal. Therefore, in the distance measurement using the range finding signal 1, the measurable distance is shorter while the distance measurement accuracy is higher. In contrast, in the distance measurement using the range finding signal 2, the measurable distance is longer while the distance measurement accuracy is lower.

Here, in a case where two range finding signals as shown in FIG. 9 are used together, it is possible to use both a range finding signal capable of higher-accuracy distance measurement and a range finding signal having a longer measurable distance, and thus it is possible to perform the distance measurement of a longer distance with higher accuracy.

Note that, in a case where the phase difference detection method is used, the modulation unit 2040 may modulate an optical phase or the optical intensity of the optical carrier wave by using the range finding signals. In addition, the range finding signal in FIG. 9 is a sine wave, the range finding signal of the phase difference detection method is not limited thereto, and may be arbitrary signal representing a periodic intensity change.

Figure 10:
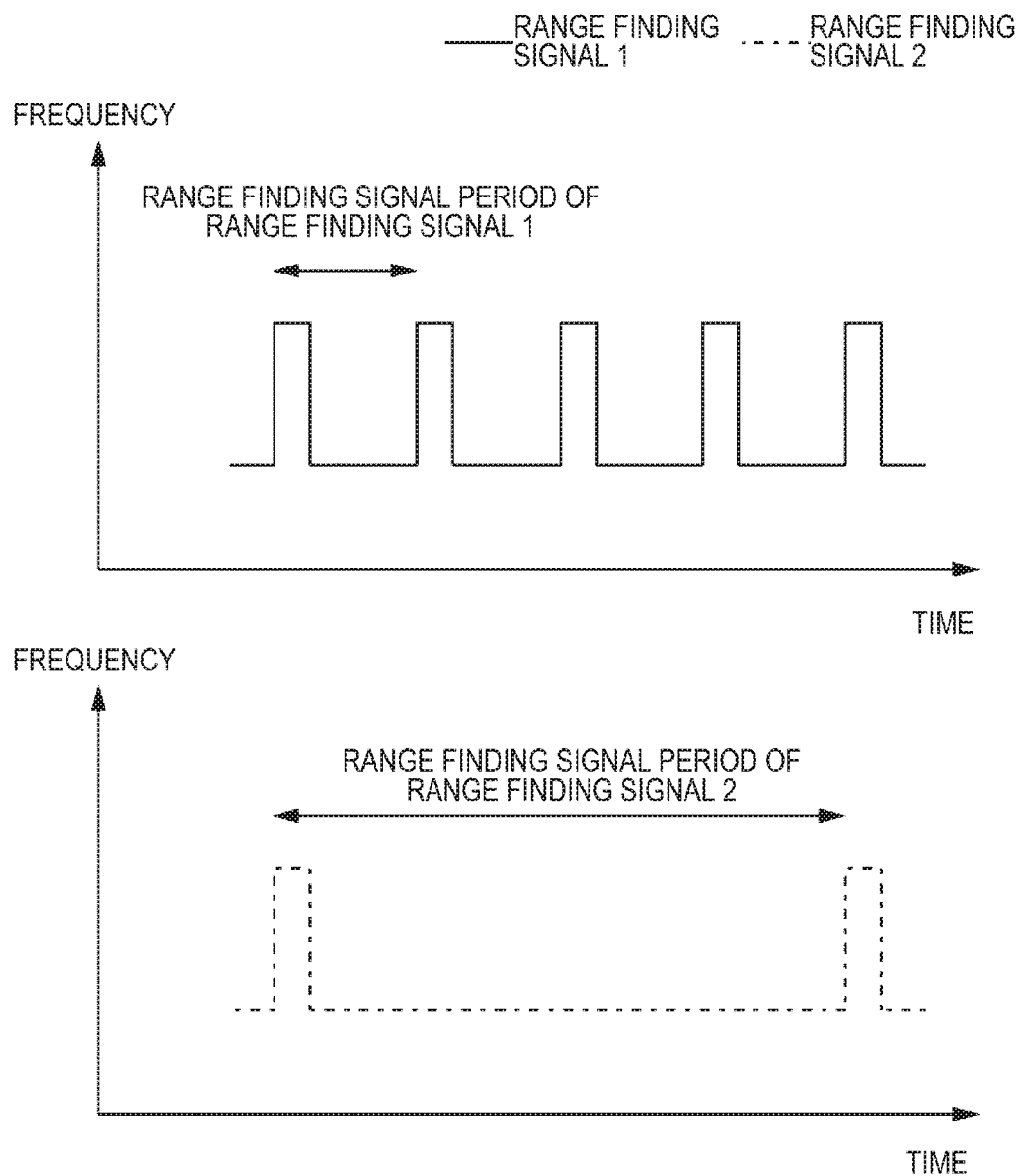
FIG. 10 is a diagram illustrating a plurality of range finding signals each having different repetition periods.

In another example, it is assumed that the ToF method is used as the range finding method. In this case, for example, the generation unit 2020 generates the plurality of range finding signals as pulse signals each having different repetition periods. FIG. 10 is a diagram illustrating the plurality of range finding signals each having the different repetition periods. In FIG. 10, the range finding signal 1 has a shorter period of the range finding signal period (here, the pulse interval), compared to the range finding signal 2.

Here, similar to the above-described phase difference detection method, in the distance measurement using the ToF method, it is known that it is possible to perform more highly-accurate distance measurement as the range finding signal period is shorter and the measurable distance is proportional to the period of the range finding signal. Therefore, in the distance measurement using the range finding signal 1, the measurable distance is shorter while the distance measurement accuracy is higher. In contrast, in the distance measurement using the range finding signal 2, the measurable distance is longer while the distance measurement accuracy is lower.

Here, in a case where two range finding signals as shown in FIG. 10 are used together, it is possible to use both a range finding signal capable of higher-accuracy distance measurement and a range finding signal having a longer measurable distance, and thus it is possible to perform the distance measurement of a longer distance with higher accuracy.

Note that, although a shape of the pulse signal is rectangular in FIG. 10, the shape of the pulse signal in the ToF method is not limited to a rectangle. In addition, in the ToF method, in addition to the range finding signal period, the intensity may be different for each range finding signal.

In the above description, 1) a case where the plurality of range finding signals are generated according to a plurality of range finding methods which are different from each other, and 2) a case where the plurality of range finding signals each having different settings are generated according to the same range finding method. However, the generation unit 2020 may combine the above cases 1) and 2). For example, in a case where four range finding signals are generated, the generation unit 2020 generates two range finding signals according to the frequency difference detection method, and generates remaining two range finding signals according to the phase difference detection method. At this time, the generation unit 2020 causes the two range finding signals generated according to the frequency difference detection method to have different frequency rates. Similarly, the generation unit 2020 causes two range finding signals generated according to the phase difference detection method to have phase modulation rates which are different from each other. In this manner, in a case where the distance measurement is performed, there are advantages in that it is not necessary to previously recognize 1) which method should be selected from among the plurality of range finding methods, and 2) in which manner the distance measurement frequency or the like in each method should be set.

In another example, all of the plurality of range finding signals may be set as the same signal. Even in a case where the distance measurement is performed using the plurality of range finding signals which are the same, it is possible to improve accuracy of the distance measurement. For example, in a case where a plurality of distance measurement results are acquired, it is possible to perform statistical processing, such as averaging, and to exclude outliers.

Note that, the range finding method used by the generation unit 2020 and its parameters may be fixedly set in advance or may be set by the user. The settings of the range finding method and the parameters are stored in, for example, the storage device accessible by the generation unit 2020.

<Generation of Transmission Light: S104>

The modulation unit 2040 generates the transmission light using each range finding signal generated by the generation unit 2020 (S104). The transmission light is generated by performing the quadrature modulation, the polarization multiplexing, or both on the optical carrier wave. It is possible for the modulation unit 2040 to embed the range finding signals, which are different from each other, in the I component and the Q component of each of the X polarized wave and the Y polarized wave of the optical carrier wave, that is, in four channels. The modulation unit 2040 treats each range finding signal as a modulation signal and modulates each component of the optical carrier wave. Note that, it is possible to use an existing technology as a technology for modulating each component of the optical carrier wave based on the modulation signal.

Here, association between the channel and the range finding signal may be fixedly set or may be set by the user. For example, the setting is stored in the storage device accessible from the generation unit 2020. The generation unit 2020 decides an output destination of each range finding signal according to the setting. For example, the range finding signal used to modulate the I component of the X polarized wave of the optical carrier wave is output to a circuit that modulates the I component of the X polarized wave of the optical carrier wave.

<Modulation Using Training Signal>

The transmission light may include a training signal in addition to the range finding signal. The training signal is used to facilitate polarization separation and quadrature demodulation performed by the extraction unit 2100. A specific description of a method of using the training signal will be described later.

In a case where the training signal is used, the modulation unit 2040 modulates the optical carrier wave by using the range finding signal and the training signal. Hereinafter, a method thereof will be described.

Figure 11:
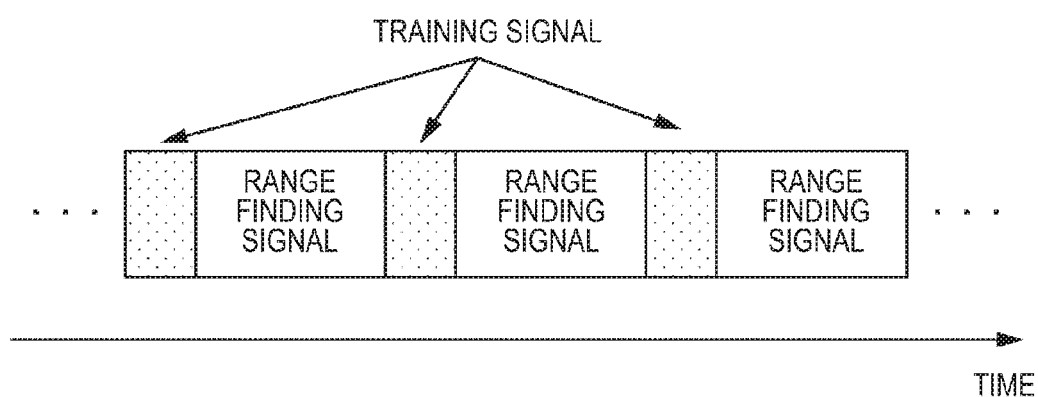
FIG. 11 is a first diagram illustrating a case where a training signal is included in the same channel as the range finding signals.
Figure 12:
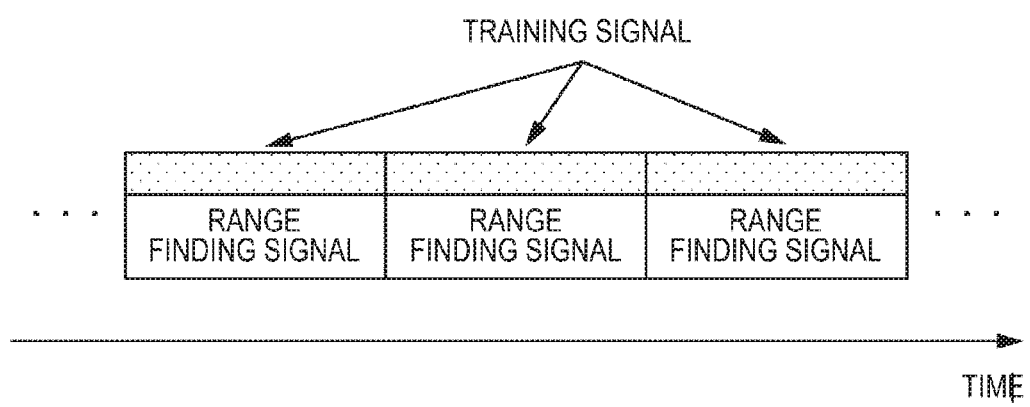
FIG. 12 is a second diagram illustrating the case where the training signal is included in the same channel as the range finding signal.

For example, it is assumed that the modulation unit 2040 includes the training signal and the range finding signal in the same channel. FIGS. 11 and 12 are diagrams illustrating a case where the training signal is included in a channel which is the same as the range finding signal. In FIG. 11, the training signal is included in the channel which is the same as the range finding signal by time division. In this case, the modulation unit 2040 generates the modulation signal by adding the training signal before the range finding signal, and modulates the optical carrier wave with the modulation signal.

In FIG. 12, the training signal is superimposed on the range finding signal, and thus the training signal is included in the channel which is the same as the range finding signal. In this case, the modulation unit 2040 generates the modulation signal by superimposing the training signal on the range finding signal, and modulates the optical carrier wave with the modulation signal. It is possible to use any method that is capable of distinguishing the training signal from the range finding signal as a method of superimposing the training signal on the range finding signal. For example, there are a method of superimposing the training signal on amplitude information of the range finding signal, a method of superimposing the training signal on phase information of the range finding signal, and a method of superimposing the training signal on a frequency which is separated from the range finding signal.

Note that, in a case where the training signal and the range finding signal are included in the same channel through time division, it is not necessary to add the training signal before all the range finding signals. That is, a plurality of range finding signals may follow a training signal.

The modulation unit 2040 may include the training signal and the range finding signal in different channels. That is, one or more of the channels of the transmission light are used to transmit the training signal instead of the range finding signal. For example, the modulation unit 2040 includes the range finding signal in either the X polarized wave or the Y polarized wave of the transmission light, and includes the training signal in the other one.

Figure 13:
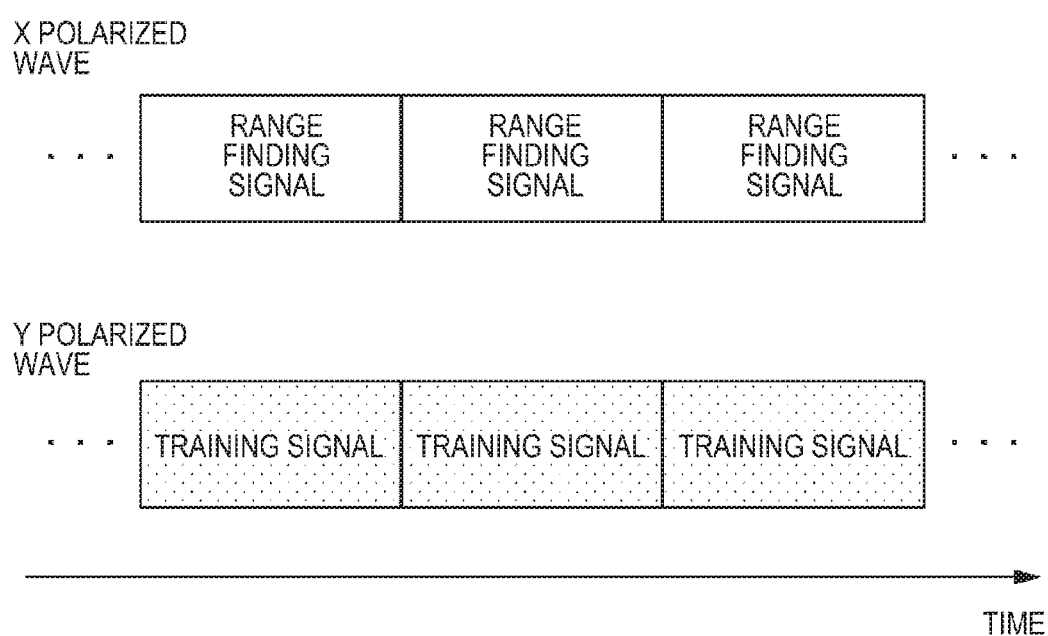
FIG. 13 is a diagram illustrating a case where the training signal and the range finding signal are included in channels each having different transmission light.

FIG. 13 is a diagram illustrating a case where the training signal and the range finding signal are included in different channels of the transmission light. In FIG. 13, the range finding signal is included in the X polarized wave of the transmission light, and the training signal is included in the Y polarized wave of the transmission light. That is, the modulation unit 2040 modulates the X polarized wave of the optical carrier wave by using the range finding signal, and modulates the Y polarized wave of the optical carrier wave by using the training signal.

The settings relating to the training signal may be fixed in advance or may be performed by the user. The settings related to the training signal are stored in, for example, a storage device accessible by the generation unit 2020.

<Polarization Separation and Quadrature Demodulation: S110>

The extraction unit 2100 extracts the reception signal corresponding to each range finding signal by demodulating the reflection light (S110). To do so, the extraction unit 2100 performs polarization separation and quadrature demodulation on the signal acquired from the reception unit 2080.

The polarization rotation occurs while the optical signal is traveling, and thus each signal acquired from the reception unit 2080 is a mixture of the X polarized wave and the Y polarized wave in the transmission light. In addition, the I component and the Q component are mixed in each polarization due to the phase rotation. Therefore, the extraction unit 2100 generates the reception signal corresponding to the range finding signal by performing the polarization separation (compensation for the polarization rotation) and the quadrature demodulation (compensation for the phase rotation) on each signal acquired from the reception unit 2080. Here, it is possible to use a known technology used in digital coherent communication can be used as a specific technology for compensating the polarization rotation and the phase rotation.

Note that, in the range finding apparatus 2000, the above-described training signal may be used for the polarization separation or the quadrature demodulation. Unlike a range finding signal that needs to be generated according to a predetermined range finding method, it is possible to generate the training signal as a signal suitable for compensation processing. Therefore, in a case where the training signal is used, the polarization separation and the quadrature demodulation become easier.

For example, it is assumed that the training signal and the range finding signal are included in the same channel through time division (refer to FIG. 11). In this case, in a case where an insertion period of the training signal is sufficiently shorter than a time constant of polarization fluctuation and phase fluctuation, it is considered that a polarization condition and a phase condition in a period during which the training signal is observed are maintained in a period during which the range finding signal is observed immediately thereafter. Here, for example, the extraction unit 2100 decides various parameters to be used for the polarization separation and the quadrature demodulation using the reflection light in the period in which the training signal is observed. For example, the parameter includes a filter coefficient of a digital filter used for the polarization separation, a frequency offset amount and a phase rotation compensation amount used for the quadrature demodulation. The extraction unit 2100 performs the polarization separation and the quadrature demodulation on the reflection light in a period during which the range finding signal is included, using the decided parameter. In this manner, it is possible to easily decide the parameters used for the polarization separation and the quadrature demodulation, compared to the case where the reflection light in the period during which the range finding signal is included.

Note that, as described above, in a case where the training signal and the range finding signal are included in the same channel through the time division, a plurality of range finding signals may follow a training signal. In this case, the parameters decided using the training signals are used in the polarization separation and the quadrature demodulation of each of the plurality of range finding signals subsequent to immediately thereafter.

In another example, it is assumed that the training signal is superimposed on a range finding signal (see FIG. 12). In this case, the extraction unit 2100 separates the reception signal into the range finding signal and the training signal. Further, the extraction unit 2100 decides the above-described various parameters used for the polarization separation and the quadrature demodulation using the training signal. Further, the extraction unit 2100 performs the polarization separation and the quadrature demodulation on the range finding signal by using the decided parameter.

The method of separating the range finding signal from the training signal differs according to the method of superimposing the range finding signal on the training signal. For example, it is assumed that the modulation unit 2040 embeds a training signal in the frequency of the optical carrier wave. At this time, for example, the modulation unit 2040 embeds a training signal having a frequency unrelated to the frequency component of the range finding signal in the optical carrier wave. In this case, the extraction unit 2100 separates the reception signal into a range finding signal and a training signal by using a frequency filter.

In another example, it is assumed that the modulation unit 2040 embeds the training signal on the amplitude of the optical carrier wave. At this time, for example, the modulation unit 2040 superimposes the training signal having a signal amplitude sufficiently smaller than an amplitude of the range finding signal. In this manner, in amplitude fluctuations of the reception signal, a larger amplitude fluctuation represents an amplitude fluctuation of the range finding signal, and a smaller amplitude fluctuation represents the training signal. In this case, the extraction unit 2100 separates the reception signal into the range finding signal and the training signal based on the magnitude of the amplitude fluctuation.

In another example, it is assumed that the training signal and the range finding signal are included in different polarizations (see FIG. 13). In this case, after performing the polarization separation, the extraction unit 2100 decides the parameters used for phase rotation compensation processing by observing the optical phase rotation amount for the polarization included in the training signal. Here, the amount of phase rotation for one polarization is the same as the amount of phase rotation for the other polarization. Here, the extraction unit 2100 performs the quadrature demodulation (separation of the I component from the Q component) by performing the phase rotation compensation processing on the polarization which includes the range finding signal by using the decided parameter.

In addition, in a case where the training signal is generated such that the amplitudes of the X polarized wave and the Y polarized wave become the same (for example, both are 1), it is possible to use Constant Modulus Algorithm (CMA) or the like, which is used in the digital coherent communication or the like, for the polarization separation. In this case, the extraction unit 2100 performs 2×2 Multi-Input Multi-Output (MIMO) processing such that the amplitudes of both polarizations are the same. For example, the 2×2 MIMO processing is configured by a two-input two-output digital filter that equalizes two inputs by four digital filters including a cross term. In the above-described CMA, the coefficients of the four digital filters are optimized such that the two signal amplitudes of the X polarized wave and the Y polarized wave are constant (for example, 1).

<Association Between Range Finding Signal and Reception Signal>

The range finding apparatus 2000 associates the reception signals acquired as a result of the polarization separation and the quadrature demodulation with the range finding signals. That is, the range finding apparatus 2000 determines which range finding signals are received before transmission for respective reception signals.

For example, the association is performed using the training signals. For example, in a case where the training signals are included in the respective channels, the training signals included in the respective channels are different from each other. That is, the association between the range finding signals and the training signals are uniquely decided. In this case, for each reception signal, the extraction unit 2100 determines the range finding signal associated with the training signal included in the reception signal. Further, the extraction unit 2100 associates the reception signal with the range finding signal determined for the reception signal.

For example, it is assumed that a reception signal 1 and a reception signal 2 include a training signal 1 and a training signal 2, respectively. In addition, it is also assumed that modulation unit 2040 causes the range finding signal 1 and the training signal 1 to be included in the same channel, and causes the range finding signal 2 and the training signal 2 to be included in the same channel. In this case, the extraction unit 2100 associates the range finding signal 1 with the reception signal 1 and associates the range finding signal 2 with the reception signal 2 based on a pattern of the received training signal.

However, the computation unit 2120 may compute the measurement distance without uniquely deciding the association between the range finding signal and the reception signal. For example, the computation unit 2120 decides the association between the range finding signal and the reception signal by computing the measurement distance for all the patterns of the association between the range finding signal and the reception signal. For example, in a case where four range finding signals are used, the measurement distance is computed for each of 24 types of association. Further, the computation unit 2120 uses a result in which the computed measurement distance is most appropriate. For example, the computation unit 2120 computes a dispersion of the measurement distance computed using each reception signal for each of the plurality of associations. Then, the computation unit 2120 handles the measurement distance acquired through association in which the computed dispersion is minimized, as a measurement result. This is because, in a case where the association between the range finding signal and the reception signal is correct, it is possible to compute the measurement distance which is correct to some extent using each reception signal, and thus it is considered that the dispersion of the computed measurement distance is small.

Note that, in a case where the X polarized wave, the Y polarized wave, or both is assigned to the training signal (refer to FIG. 13), it is possible to easily distinguish the reception signal representing the training signal from the reception signal representing the range finding signal. That is, since the training signal and the range finding signal are formed with completely different patterns, it is possible to easily distinguish which of the X polarized wave and the Y polarized wave is the training signal and which is the range finding signal by extracting features such as a signal spectrum or a reception signal pattern. Here, in this case, the computation unit 2120 performs the above-described processing for all the patterns of the association between the reception signal representing the range finding signal and the range finding signal. For example, in a case where two range finding signals are used, the computation unit 2120 computes the measurement distance for each of the two types of association.

<Computation of Measurement Distance: S112>

The computation unit 2120 computes the measurement distance using the reception signal. Note that, it is possible to use an existing technology as a technology for computing the measurement distance by comparing the range finding signal and the reception signal based on the adopted range finding method.

The computation unit 2120 computes the measurement distance for each of the plurality of reception signals (excluding a reception signal representing only the training signal). That is, the plurality of measurement distances are computed. The computation unit 2120 computes the measurement distance as the measurement result using the plurality of measurement distances. For example, the computation unit 2120 handles a value acquired by performing statistical processing on the plurality of measurement distances as the measurement distance of the measurement result. The statistical processing is, for example, averaging processing, median processing, or the like. At this time, the computation unit 2120 may perform processing of excluding outliers.

In another example, distance information acquired by using the plurality of range finding signals may be combined. For example, pieces of distance information computed based on two methods of a range finding method 1 and a range finding method 2 may be combined, a range finding performance acquired by a period of the range finding signal 1 being "a range finding resolution of 1 m and a measurable distance of 100 m", a range finding performance acquired by a period of the range finding signal 2 being "a range finding resolution of 1 cm and a measurable distance of 1 m". In this case, the computation result of the range finding method 1 is used for approximate distance information in units of 1 m, whereas the computation result of the range finding method 2 is used for finer distance information in units of 1 cm. In a case where both pieces of information are added, it is possible to measure a distance of 100 m by a notch of 1 cm.

In another example, a priority may be decided in advance for the range finding signal. In this case, in a case where the measurement distance is acquired using a reception signal corresponding to the higher-priority range finding signal, the computation unit 2120 does not use a reception signal corresponding to a lower-priority range finding signal. For example, a priority of a range finding signal having a finer distance resolution is set to be as high. In this manner, in a case where it is possible to compute the measurement distance using the reception signal corresponding to the range finding signal having the finer distance resolution, this measurement distance is used as the measurement result, and measurement distance acquired using the reception signal corresponding to the range finding signal having the coarser distance resolution is not used.

In another example, the computation unit 2120 may output each measurement distance in association with a measuring method (the range finding method and setting thereof) used for computing the measurement distance. For example, in a case where the association is displayed on a display device or the like, it is possible for the user of the range finding apparatus 200 to view a list of associations between the measurement distance and the measurement method. In this case, for example, the user decides a measurement distance to be adopted as the measurement result according to a surrounding environment (an approximate distance to the object to be measured, which is recognized through eye measurement) or each output measurement distance. For example, in a case of bad weather, the user adopts a measurement distance computed using a measurement method suitable for distance measurement in the bad weather. Even in a case where the user decides the measurement distance to be adopted as above, the range finding apparatus 2000 of the example embodiment has an advantage that it is not necessary to change the setting of the range finding apparatus 2000 according to the surrounding environment.

<Output of Result>

There are various output destinations of the measurement distance computed by the computation unit 2120. For example, the computation unit 2120 stores the computed measurement distance in a predetermined storage device. In another example, the computation unit 2120 causes the display device connected to the range finding apparatus 2000 to display the computed measurement distance. In another example, the computation unit 2120 may output the computed measurement distance to another computer (a PC, a server apparatus, a mobile terminal, or the like).

Hereinabove, although the example embodiment of the present invention is described with reference to the drawings, the example embodiment is an example of the present invention, and it is possible to employ various configuration other than the above.

Although a part or entirely of the above-described example embodiment are described as in the following supplementary, the present invention is not limited thereto.

1. A range finding apparatus of the present invention includes
a generation unit that generates a plurality of range finding signals,
a modulation unit that generates transmission light acquired by performing at least one of quadrature modulation and polarization modulation on an optical carrier wave by using each of the generated range finding signals,
a transmission unit that transmits the generated transmission light.
a reception unit that receives reflection light which is light acquired in such a way that the transmission light is reflected in an object to be measured,
an extraction unit that extracts reception signals corresponding to the respective range finding signals by demodulating the reflection light, and
a computation unit that computes a distance to the object to be measured by using any one or more of the extracted reception signals.

2. In the range finding apparatus of 1, at least two of the plurality of range finding signals, which are generated by the generation unit, are signals used in range finding methods which are different from each other.

3. In the range finding apparatus of 1 or 2, at least two of the plurality of range finding signals are range finding signals used in a frequency difference detection method, and
the generation unit modulates the at least two range finding signals at frequency modulation rates which are different from each other.

4. In the range finding apparatus of 1 or 2, at least two of the plurality of range finding signals are range finding signals used in a phase difference detection method, and
the generation unit modulates the at least two range finding signals at phase modulation rates which are different from each other.

5. In the range finding apparatus of 1 or 2, at least two of the plurality of range finding signals are range finding signals used in a time-of-flight measurement method, and
the generation unit modulates the at least two range finding signals by using signals each having different repetition periods.

6. In the range finding apparatus according to any one of 1 to 5, the computation unit computes the distance to the object to be measured for each reception signal by comparing each extracted reception signal with a relevant range finding signal, and computes the distance to the object to be measured, as a measurement result, based on a plurality of the computed distances.

7. In the range finding apparatus of any of 1 to 6, the modulation unit generates a modulation signal by using the range finding signal and a training signal, and modulates the optical carrier wave by using the modulation signal, and
the extraction unit demodulates the reflection light by using the training signal included in the reflection light.

8. In the range finding apparatus of 7, the modulation unit generates the modulation signal by adding the training signal before the range finding signal for each of the plurality of range finding signals, and
the extraction unit
decides a parameter to be used for polarization separation or quadrature demodulation by using the reflection light in a period in which the training signal is included, and performs polarization separation or quadrature demodulation on the reflection light in a period including the range finding signal by using the decided parameter.

9. In the range finding apparatus of 7, the modulation unit modulates a first polarized wave of the optical carrier wave by using the range finding signals, and modulates a second polarized wave of the optical carrier wave by using the training signal, the extraction unit decides a parameter used for quadrature demodulation by using the first polarized wave of the reflection light including the training signal, and performs quadrature demodulation on the second polarized wave of the reflection light including the range finding signal by using the decided parameter.

10. A control method executed by a computer, the method including a generation step of generating a plurality of range finding signals, a modulation step of generating transmission light acquired by performing at least one of quadrature modulation and polarization modulation on an optical carrier wave by using each of the generated range finding signals, a transmission step of transmitting the generated transmission light, a reception step of receiving reflection light which is light acquired in such a way that the transmission light is reflected in an object to be measured, an extraction step of extracting reception signals corresponding to the respective range finding signals by demodulating the reflection light, and a computation step of computing a distance to the object to be measured by using any one or more of the extracted reception signals.

11. In the control method of 10, at least two of the plurality of range finding signals, which are generated in the generation step, are signals used in range finding methods which are different from each other.

12. In the control method of 10 or 11, at least two of the plurality of range finding signals are the range finding signals used in a frequency difference detection method, and the generation step includes modulating the at least two range finding signals at frequency modulation rates which are different from each other.

13. In the control method of 10 or 11, at least two of the plurality of range finding signals are range finding signals used in a phase difference detection method, and the generation step includes modulating the at least two range finding signals at phase modulation rates which are different from each other.

14. In the control method of 10 or 11, at least two of the plurality of range finding signals are range finding signals used in a time-of-flight measurement method, and the generation step includes modulating the at least two range finding signals by using signals each having different repetition periods.

15. In the control method of any one of 10 to 14, the computation step includes computing the distance to the object to be measured for each reception signal by comparing each extracted reception signal with the relevant range finding signal with a relevant range finding signal, and computes the distance to the object to be measured, as a measurement result, based on a plurality of the computed distances.

16. In the control method of any one of 10 to 15, the modulation step includes generating a modulation signal by using the range finding signal and a training signal, and modulating the optical carrier wave by using the modulation signal, and the extraction step includes demodulating the reflection light by using the training signal included in the reflection light.

17. In the control method of 16, the modulation step includes generating the modulation signal by adding the training signal before the range finding signal for each of the plurality of range finding signals, and the extraction step includes deciding a parameter to be used for polarization separation or quadrature demodulation by using the reflection light in a period in which the training signal is included, and performing the polarization separation or the quadrature demodulation on the reflection light in the period including the range finding signal by using the decided parameter.

18. In the control method of 16, the modulation step includes modulating a first polarized wave of the optical carrier wave by using the range finding signals, and modulates a second polarized wave of the optical carrier wave by using the training signal, the extraction step includes deciding a parameter used for the quadrature demodulation by using the first polarized wave of the reflection light including the training signal, and performing quadrature demodulation on the second polarized wave of the reflection light including the range finding signal by using the decided parameter.

This application claims a priority based on Japanese Patent Application No. 2017-240773 filed on Dec. 15, 2017, and the entirety of the disclosure is incorporated herein.

The invention claimed is:

1. A range finding apparatus comprising:
a first processor to generate a plurality of range finding signals, wherein at least two of the range finding signals are used in range finding methods that are different from one another;
a modulator to generate a modulation signal by adding a training signal before each of the generated range finding signals, and to generate transmission light by performing a combination of quadrature modulation and polarization modulation on an optical carrier wave by using each of the generated range finding signals and by using the training signal, wherein the combination used in generating the transmission light for each generated range finding signal is different;
a first optics to transmit the generated transmission light;
second optics to receive, as reflection light, the transmission light as reflected by an object to be measured; and
a second processor to extract reception signals respectively corresponding to the range finding signals by demodulating the reflection light by using the training signal included in the reflection light, to compute a distance to be measured by using any one or more of the extracted reception signals, to determines a parameter to be used for polarization separation or quadrature demodulation by using the reflection light in a period in which the training signal is included, and to perform the polarization separation or the quadrature demodulation on the reflection light in the period including the range finding signal by using the determined parameter.

2. The range finding apparatus according to claim 1, wherein the at least two of the range finding signals are used in a frequency difference detection method, and wherein the first processor modulates the at least two of the range finding signals at frequency modulation rates different from one other.

3. The range finding apparatus according to claim 1, wherein the at least two of the range finding signals are used in a phase difference detection method, and
wherein the first processor modulates the at least two of the range finding signals at phase modulation rates different from one other.

4. The range finding apparatus according to claim 1, wherein the at least two of the range finding signals are used in a time-of-flight measurement method, and
wherein the first processor modulates the at least two of the range finding signals using signals having different repetition periods.

5. The range finding apparatus according to claim 1, wherein the second processor computes the distance to the object by comparing the extracted reception signals with a relevant range finding signal to respectively compute per-signal distances, and by computing the distance to the object to be measured based on the computed per-signal distances.

6. A control method executed by a computer, the method comprising:
generating a plurality of range finding signals, wherein at least two of the range finding signals are used in range finding methods that are different from one another;
generating a modulation signal by adding a training signal before each of the generated range finding signals;
generating transmission light by performing a combination of quadrature modulation and polarization modulation on an optical carrier wave by using each of the generated range finding signals and by using the training signal, wherein the combination used in generating the transmission light for each generated range finding signal is different;
transmitting the generated transmission light;
receiving, as reflection light, the transmission light reflected by an object to be measured;
extracting reception signals respectively corresponding to the respective range finding signals by demodulating the reflection light by using the training signal included in the reflection light;
computing a distance to the object to be measured by using any one or more of the extracted reception signals;
determining a parameter to be used for polarization separation or quadrature demodulation by using the reflection light in a period in which the training signal is included; and
performing the polarization separation or the quadrature demodulation on the reflection light in the period including the range finding signal by using the determined parameter.

7. A range finding apparatus comprising:
a first processor to generate a plurality of range finding signals, wherein at least two of the range finding signals are used in range finding methods that are different from one another;
a modulator to generate a modulation signal by using each of the generated range finding signals, to generate transmission light by performing a combination of quadrature modulation and polarization modulation on an optical carrier wave such that a first polarized wave of the optical carrier wave is modulated by using each of the generated range finding signals and such that a second polarized wave of the optical carrier wave is modulated by using a training signal, wherein the combination used in generating the transmission light for each generated range finding signal is different;
a first optics to transmit the generated transmission light;
second optics to receive, as reflection light, the transmission light as reflected by an object to be measured; and
a second processor to extract reception signals respectively corresponding to the range finding signals by demodulating the reflection light by using the training signal included in the reflection light, to compute a distance to be measured by using any one or more of the extracted reception signals, to determine a parameter used for the quadrature demodulation by using the first polarized wave of the reflection light including the training signal, and to perform quadrature demodulation on the second polarized wave of the reflection light including each of the generated range finding signals by using the determined parameter.

* * * * *